United States Patent [19]
Von Kaler et al.

[11] 3,812,735
[45] May 28, 1974

[54] TRANSMISSION
[75] Inventors: Roland L. Von Kaler, Tecumseh; Norman E. Jolliff, Tipton, both of Mich.
[73] Assignee: Tecumseh Products Company, Tecumseh, Mich.
[22] Filed: Jan. 31, 1973
[21] Appl. No.: 328,481

Related U.S. Application Data
[63] Continuation-in-part of Ser. No. 171,920, Aug. 16, 1971, abandoned.

[52] U.S. Cl. .............................................. 74/371
[51] Int. Cl. ............................................ F16h 3/08
[58] Field of Search ............................ 74/325, 371

[56] References Cited
UNITED STATES PATENTS
1,985,015  12/1934  Bush ................................ 74/371 X
3,154,962  11/1964  Mukherje ...................... 74/371 X Primary Examiner—Leonard H. Gerin
Attorney, Agent, or Firm—Barnes, Kisselle, Raisch & Choate

[57] ABSTRACT

A change-speed transmission with a shift mechanism which selectively couples a plurality of change gears one at a time to a shaft on which the gears are journalled. The shift mechanism is disposed entirely within the transmission housing and includes a shift key arranged for axial sliding movement in a groove in the shaft. A pair of axially spaced projections at one end of the key project outwardly of the groove to embrace a collar which is journalled on the shaft. The collar is axially shifted on the shaft by a rotary shift fork which engages a circular groove in the collar to selectively position the key axially of the shaft in its several gear-engaging positions. A third radial projection at the other end of the key engages a different gear in each of the several positions thereby drivingly coupling the selected gear to the shaft to provide various forward drive speeds. The end projection of the projection pair which embrace the collar is adapted to engage a reverse gear on the other end of the shaft for providing a single reverse speed. The arrangement and construction of the several gears and the shift key are such that when the key is shifted between adjacent gear-engaging positions, it always passes through a neutral position wherein no gear is drivingly coupled to the shaft. The shift mechanism includes a detent arrangement for positively establishing selected shift positions which are correlated to the gear-engaging and neutral positions of the shift key. The particular detent arrangement permits a neutral safety switch to be used with the shift mechanism without any additional parts other than the switch itself so that the engine to which the transmission is coupled may be cranked when the transmission is in any one of its several neutral positions. A modified change speed transmission is also disclosed incorporating an improved yieldable self-biasing spring shift key, gear construction and detent sector.

65 Claims, 15 Drawing Figures

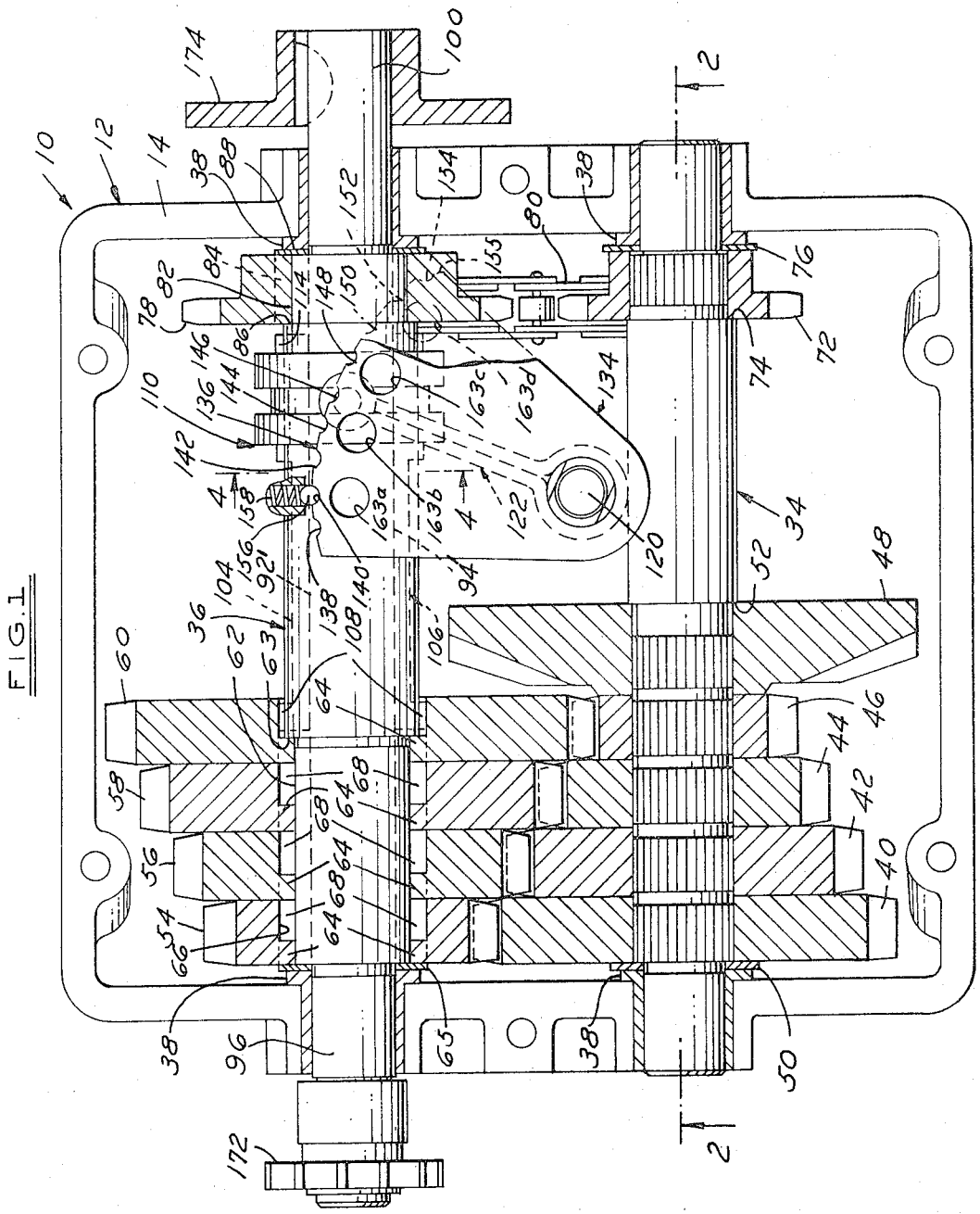

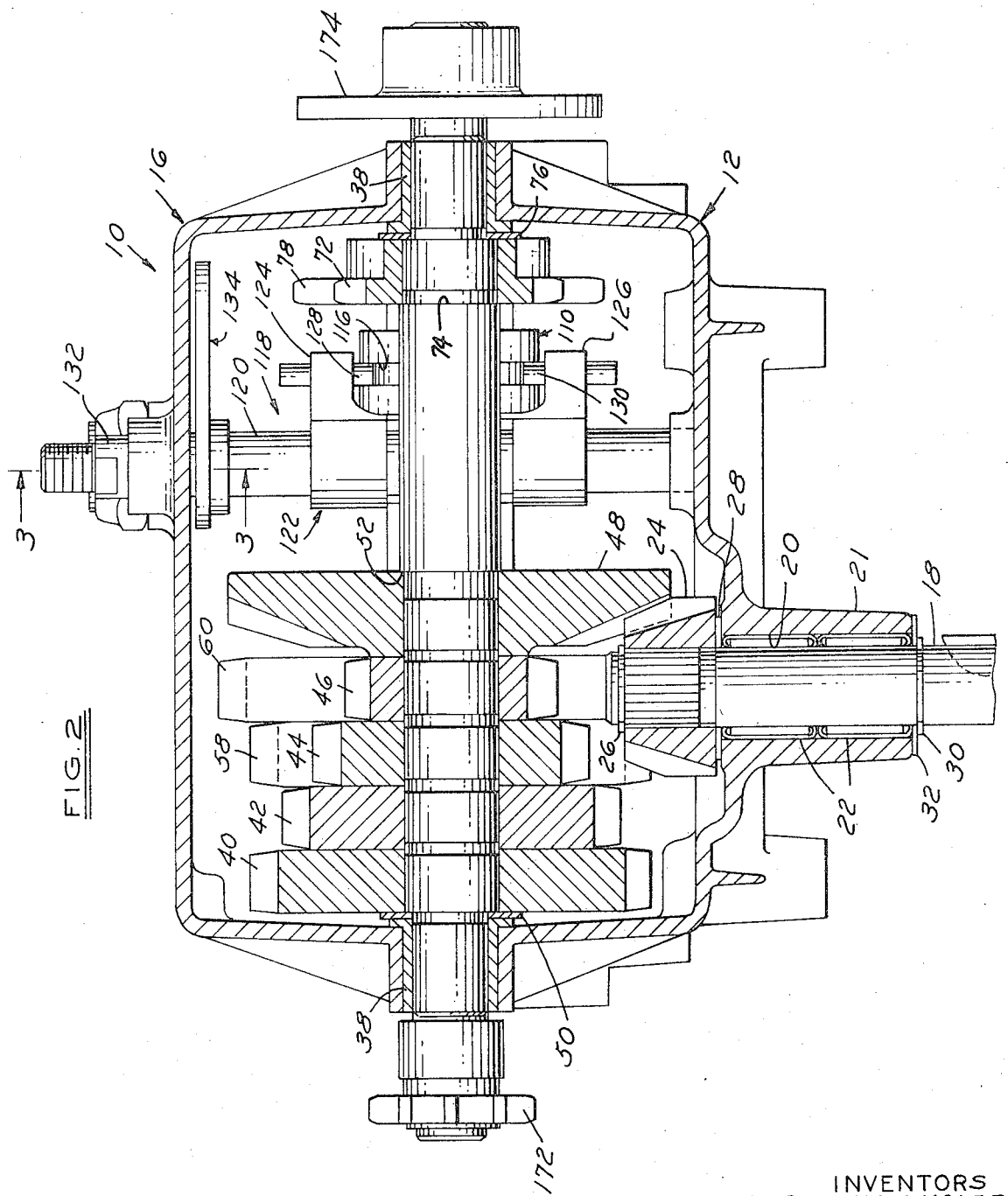

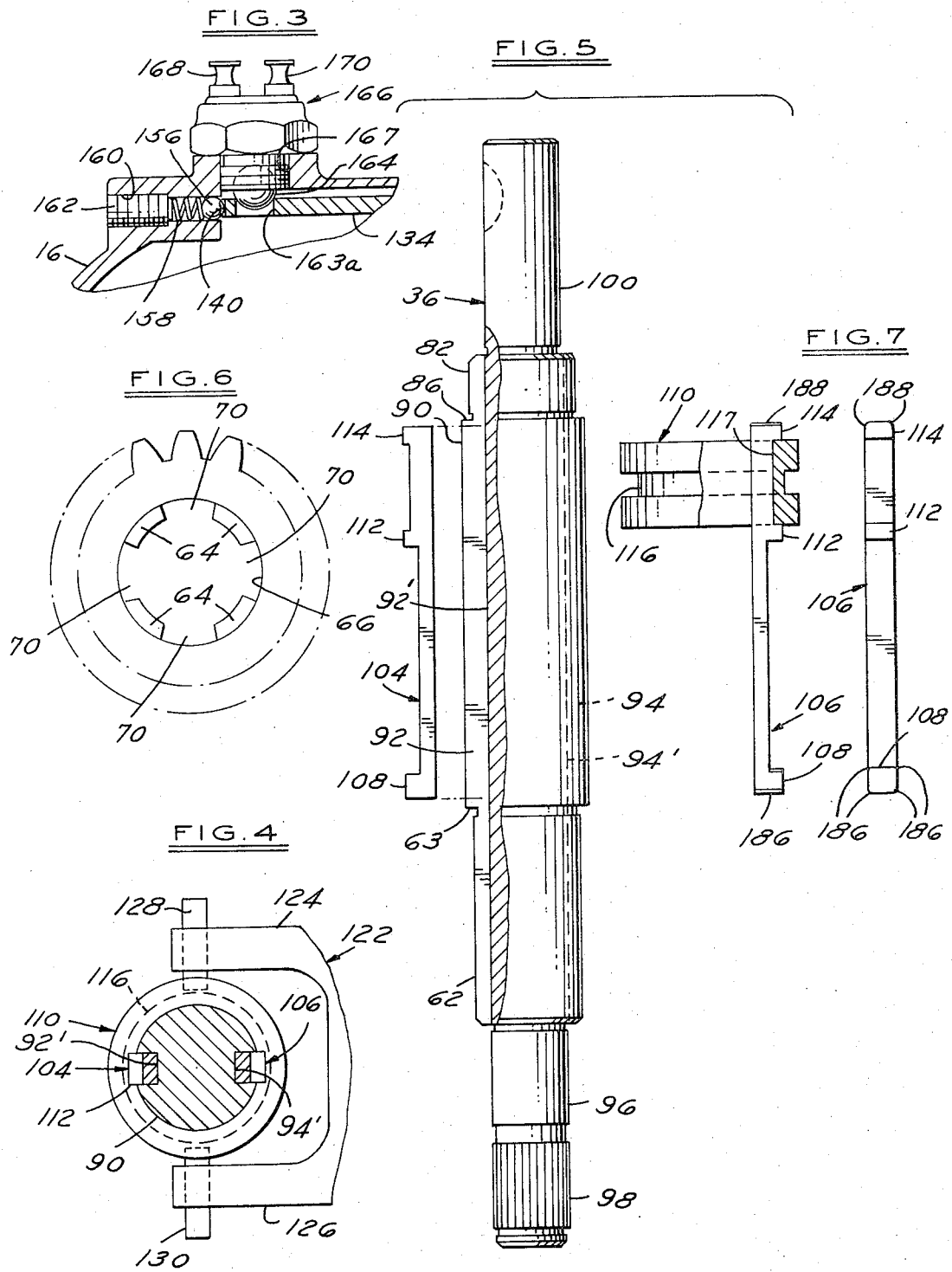

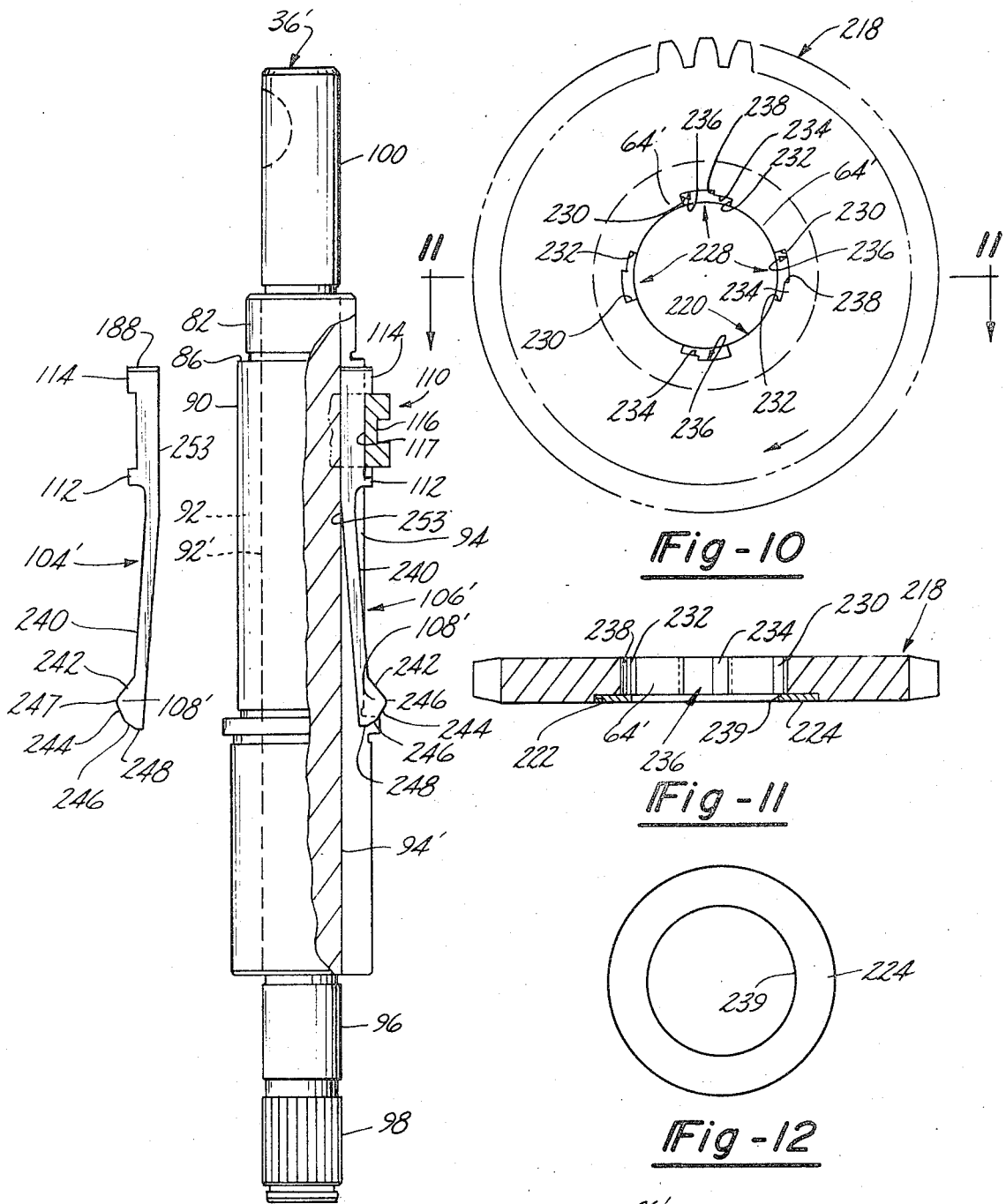

TRANSMISSION

This application is a continuation-in-part of our co-pending application Ser. No. 171,920, filed Aug. 16, 1971, entitled "Transmission" and assigned to the assignee of record herein and now abandoned.

This invention relates to transmissions and in particular to a gear shifting arrangement for an in-line transmission.

In an in-line transmission, a plurality of gears forming a change-speed gear set are journalled side-by-side on a shaft and are in constant running mesh with corresponding companion gears. The shifting arrangement drivingly couples the change-speed gears to the shaft one at a time to provide the different transmission ratios. In one known type of shifting arrangement for this type of transmission, a key is axially slid in a groove in the shaft on which the change gears are journalled to couple the gears one at a time to the shaft.

The present invention contemplates an improvement in the above-described type of transmission gear shifting arrangement. The construction of the improved shifting arrangement permits component parts to be subassembled onto the transmission shaft without using separate attaching parts, the object of the construction being to greatly facilitate the assembly of the component parts into the transmission, reducing the cost and complexity thereof.

A further object of the invention is to provide a manually operable shifting arrangement wherein the shift effort, while being easy and smooth, provides sufficient "feel" to enable the operator to positively sense the shift positions.

An additional aspect permits a neutral start safety switch to be used with the improved shifting arrangement without the need of additional parts other than the switch itself.

Some additional objects of this invention are to provide a transmission with a change-speed gear set and key arrangement of economical manufacture and assembly which can be readily and smoothly shifted into any gear from any other gear or neutral position, which eliminates backlash or free wheeling of the engaged transmission, is of comparatively economical manufacture and assembly, has a long useful life, and is substantially service and maintenance free.

These and other objects, features and advantages of this invention will be apparent from the following description, appended claims and accompanying drawings in which:

FIG. 1 is a horizontal sectional view taken substantially along the transmission case edge flange and with the transmission cover removed.

FIG. 2 is a vertical sectional view of the transmission of FIG. 1 taken substantially along the line 2—2 in FIG. 1.

FIG. 3 is a vertical sectional view taken along line 3—3 in FIG. 2.

FIG. 4 is a vertical sectional view taken along line 4—4 in FIG. 1.

FIG. 5 is an exploded view taken in the same direction as the view of FIG. 1 showing the output shaft, two shift keys and the shift collar of the transmission of FIG. 1 shown separately therefrom.

FIG. 6 is an axial end view of a typical change gear of the transmission of FIG. 1.

FIG. 7 is a top view of one of the two shift keys shown in FIG. 5.

FIG. 9 is a partially sectioned and partly exploded view taken in the same direction as the view of FIG. 8 showing the output shaft, two shift keys and the shift collar of the transmission of FIG. 8.

FIG. 10 is an axial end elevational view of a typical change gear of the transmission of FIG. 8.

FIG. 11 is a horizontal sectional view taken on line 11—11 of FIG. 10.

FIG. 12 is an axial end view of a typical washer which is adapted to be received in the change gear of FIG. 10.

FIG. 13 is a sectional view taken on line 13—13 of FIG. 8.

Figure 8:
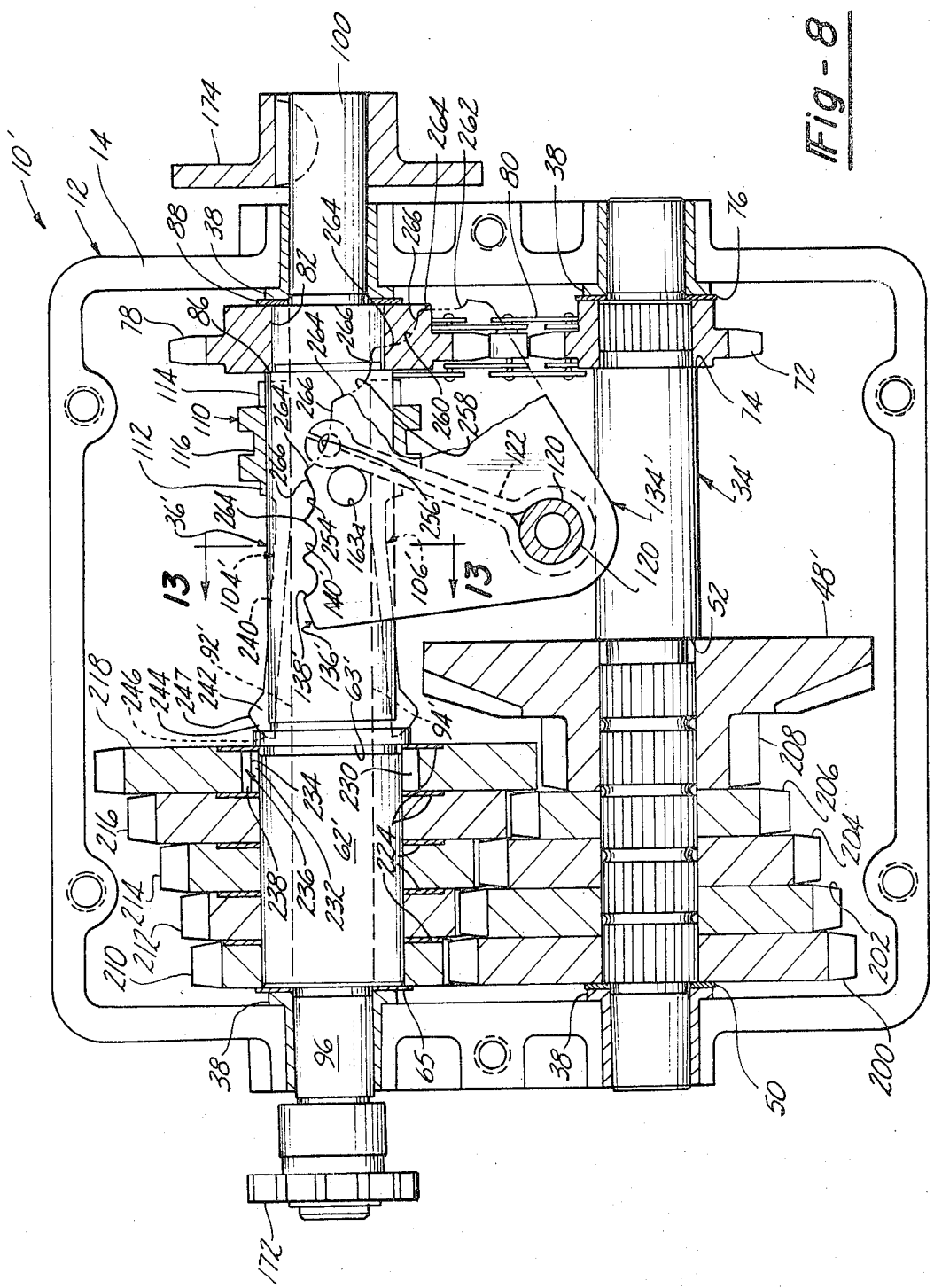
FIG. 8 is a horizontal sectional view of a modified form of a transmission embodying this invention taken substantially along the transmission case edge flange with the transmission cover removed.

Referring to FIGS. 1 and 2, the transmission 10 of the invention comprises a case 12 whose upper edge 14 mates with the lower edge (not shown) of a cover 16 to enclose the transmission mechanism. A vertical input shaft 18 (FIG. 2) is journalled within a cylindrical bore 20 of an elongated boss 21 in the bottom wall of case 12 by needle bearings 22. The inner splined end of shaft 18 receives a bevel pinion gear 24. Gear 24 is retained on shaft 18 by a retaining ring 26, and bears against a thrust race 28 between itself and case 12. A second retaining ring 30 and washer seal 32 on the external portion of shaft 18 retain the described input arrangement on case 12.

A counter shaft 34 and an output shaft 36 (FIG. 1) are journalled in the right-hand and left-hand end walls of the transmission enclosure by means of flanged sealing bushings 38. Four companion spur gears 40, 42, 44 and 46 and a bevel gear 48 are keyed side-by-side on counter shaft 34 for rotation therewith. The five gears 40 through 48 are retained on shaft 34 between a thrust race 50 and a circular shoulder 52 on shaft 34. Bevel gear 48 meshes with bevel pinion gear 24 so that rotation of input shaft 18 rotates all five gears 40 through 48 in unison.

Companion gears 40, 42, 44 and 46 are in constant running mesh with four spur change gears 54, 56, 58 and 60 respectively. Change gears 54 through 60 are journalled for free rotation on an intermediate diameter cylindrical portion 62 of output shaft 36. Gears 54 through 60 are axially retained as a cluster on portion 62 by a shoulder 63 of shaft 36 and a thrust race 65. Referring also to FIG. 6, each change gear 54 through 60 has four identical arcuately extending teeth 64 which project radially inwardly of identical circular gear bores 66 to journal the gear on shaft 36. Each tooth 64 has a 45° arcuate extent, and the four teeth 64 are symmetrically arranged to define 45° arcuate free spaces 70 between adjacent teeth. As can be seen in FIG. 1, the axial dimension of each tooth 64 is slightly less than one-half the axial dimension of the gear. Therefore, this construction defines an annular free space 68 adjacent teeth 64 and spaces 70 which lies radially between the right-hand portion of each bore 66 and portion 62 of shaft 36. This structure of gears 54 through 60 enables transmission 10 to be properly shifted through four forward speeds as will become apparent.

Because input shaft 18 rotates in only one direction to similarly rotate gears 54 through 60, a single reverse speed is provided by a sprocket and chain arrangement located adjacent the right-hand end wall. A sprocket gear 72 is keyed to shaft 34 for rotation therewith and axially retained thereon by a shoulder 74 and a thrust race 76. Sprocket 72 drives a sprocket gear 78 on shaft 36 by means of an endless roller chain 80, only a portion of which is illustrated in FIG. 1. Sprocket 78 is journalled for free rotation on another intermediate diameter cylindrical portion 82 of shaft 36 of the same diameter as portion 62, by means of four inwardly projecting arcuate teeth 84 whose circumferential extent is the same as teeth 64 of gears 54 through 60 but whose axial dimension is the same as that of sprocket 78 itself. This construction defines four 45° arcuate spaces (not shown) similar to spaces 70 of gears 54 through 60. Sprocket 78 is retained on portion 82 by a circular shoulder 86 of shaft 36 and a thrust race 88.

The structure of the improved shifting arrangement of the invention can be better understood by referring to FIG. 5 in addition to FIGS. 1 and 2. Output shaft 36 further includes a maximum diameter cylindrical portion 90 between the portions 62 and 82, the axially opposite ends of portion 90 defining shoulders 63 and 86. Two diametrically opposed rectangular grooves 92 and 94 extend axially of shaft 36 all the way through portions 62, 90 and 82 and have their respective flat bottom surfaces 92' and 94' (FIGS. 4 and 5) tangent to the outer periphery of the minimum diameter cylindrical opposite end portions 96-98 and 100 of shaft 36. Hence, the axially opposite ends of each groove 92 and 94 are open and accessible for endwise insertion of two identical shift keys 104 and 106 of rectangular cross-section which are slidable axially of shaft 36 within grooves 92 and 94 respectively. The width of each key 104, 106 is dimensioned to fit snugly within the rectangular cross-section of grooves 92 and 94. The length of each key 104, 106 is slightly less than the length of portion 90 of shaft 36, and the two keys occupy the position illustrated in FIG. 1 when the transmission is in its primary neutral position. A radial projection 108 at the left-hand end of each key (as viewed in FIG. 1) travels within the portions of grooves 92 and 94 which are coextensive with shaft portions 62 when keys 104, 106 are shifted to the left from the illustrated position. Projections 108 project radially outwardly beyond the surface of portion 62 and terminate just short of the inside diameter of bores 66 in gears 54 through 60 to permit projections 108 to be axially shifted through gears 54 through 60.

With keys 104, 106 in the primary neutral position of FIG. 1, projections 108 are within the annular free space 68 of gear 60. When gear 60 is rotated relative to shaft 36 to a position wherein projections 108 register with diametrically opposite spaces 70 of gear 60, keys 104, 106 may be shifted to the left from the position illustrated in FIG. 1 to bring projections 108 into diametrically opposed spaces 70 and thus between adjacent pairs of teeth 64. Further rotation of gear 60 causes two diametrically opposed teeth 64 to engage projections 108 to thereby couple gear 60 in rotational driving relation to shaft 36 (first gear). Further leftward shifting of keys 104, 106 disengages projections 108 from teeth 64 of gear 60 so that projections 108 are now situated within space 68 of gear 58. The axial dimension of projections 108 being less than the axial dimension of spaces 68 prevents coupling of more than one change gear at a time to shaft 36. Keys 104, 106 may be further shifted to selectively individually couple gears 58, 56 and 54 to shaft 36 in similar fashion (second, third and fourth gears). When keys 104, 106 are at their far left limit of travel, the left-hand ends of the keys are registered between teeth 64 of gear 54 and flush with thrust race 65. While the illustrated construction of teeth 64 is merely exemplary, such an arrangement provides four possible gear engagement positions per gear revolution and prevents excessive wrap-up of shaft 36.

A shift collar 110 is journalled on portion 90 of shaft 36 and encircles keys 104, 106 for axially shifting the keys. The right-hand portion of each key 104, 106 comprises two projections 112 and 114 which project radially outwardly beyond the surface of portion 90 (and the bore 117 of collar 110) and are axially separated so that collar 110 is snugly embraced therebetween (FIG. 5). The illustrated construction provides smooth shifting performance and facilitates subassembly of keys 104, 106 and collar 110 onto shaft 36. Keys 104 and 106 are first inserted within the collar bore, prior to assembly of these parts to shaft 36, so that projections 112, 114 embrace collar 110 as illustrated by the engagement of key 106 with collar 110 in FIG. 5. With the two keys held manually diametrically opposed relatively to the axis of collar 110, collar 110 is slipped endwise over either end 96-98 or 100 of shaft 36, and rotated until keys 104, 106 are angularly aligned with grooves 92, 94. Collar 110 may then be slid further onto shaft 36, thus inserting keys 104, 106 endwise into grooves 92, 94. The keys are now securely captured on shaft 36 by assembling gears 54-60, sprocket 78, thrust races 65 and 88 and bushings 38 on shaft 36 and dropping this sub-assembly into place in housing 12.

It will be noted that projections 114, in addition to retaining collar 110, serve as clutch dogs to engage the internal teeth of sprocket 78 when keys 104, 106 are shifted to the right from the position illustrated in FIG. 1 to thereby couple sprocket 78 in driving relation to shaft 36.

Returning to FIGS. 1, 2 and 4, shifter mechanism 118 comprises a vertical shaft 120 journalled in the upper and lower walls of the transmission enclosure. A bifurcated shift fork 122 having upper and lower arms 124, 126 is affixed to shaft 120. The radially outer ends of arms 124, 126 receive coaxial pins 128 and 130 which project inwardly thereof to engage a central circular external groove 116 of collar 110. Pins 128 fit snugly within groove 116, providing only enough free play to permit collar 110 to freely revolve on and/or with shaft 36. The upper external end 132 of shaft 120 (FIG. 2) is adapted to be rotated by a crank and actuator arrangement (e.g., a Bowden cable) not illustrated. Counterclockwise rotation of shaft 120 (as viewed in FIG. 1) shifts collar 110 axially to the left and thereby similarly moves keys 104, 106 to successively engage gears 60, 58, 56 and 54. Clockwise rotation of shaft 120 shifts keys 104, 106 to the right to engage sprocket 78 to effect reverse drive.

As best seen in FIGS. 1 and 2, a sector plate 134 is affixed to the upper portion of shaft 120 within the transmission enclosure. The outer arcuate edge 136 of plate 134 is concentric with shaft 120 and is provided with a plurality of nine angularly spaced notches or detent seats 138 through 154 which are numbered in increasing order in the clockwise direction as viewed in FIG. 1. As better seen in FIG. 3, seats 138 through 154 are adapted to be engaged by a detent ball 156 which is biased inwardly toward plate 134 by a spring 158. Ball 156 and spring 158 are situated within an opening 160 in cover 16, and the force of ball 156 against plate 134 is set by an adjustment screw 162 which is threaded into opening 160. The engagement of ball 156 with the seats 138 through 154 is correlated to the axial position of keys 104, 106 as follows.

With transmission 10 in the position illustrated in FIG. 1, ball 156 engages detent 140, thus establishing the primary neutral position. When shaft 120 is rotated clockwise to engage ball 156 with seat 138, projections 114 of keys 104, 106 drivingly connect sprocket 78 to shaft 36, thus establishing the reverse position. Further clockwise movement of plate 134 is prevented by abutment of the chamfered corner 155 adjacent seat 154 with an internal stop (not shown) on cover 16. When shaft 120 is rotated counterclockwise to engage ball 156 with seat 142, projections 108 of keys 104, 106 drivingly connect gear 60 to shaft 36, establishing first or low forward speed. Further counterclockwise rotation of shaft 120 to engage ball 156 with seat 144 causes projections 108 to disengage gear 60 and to shift into space 68 of gear 58, thus providing an intermediate neutral position between first and second speed. Similarly, engagement of ball 156 with seats 146, 150 and 154 establishes second, third and fourth forward speeds respectively by engaging projections 108 with the teeth 64 of gears 58, 56 and 54 respectively in that order. Movement of plate 134 beyond full counterclockwise position (i.e., engagement of ball 156 with seat 154) is prevented by abutment of the left-hand ends of keys 104, 106 with thrust race 65. Seats 148 and 152 define additional intermediate neutral positions between second/third and third/fourth forward speeds.

The transmission thus far described combines an easy, smooth shift effort having sufficient "feel" to enable the operator to sense the individual shift positions with a rugged operational capability. It should be understood, however, that it may sometimes be desirable to modify this arrangement. For example, the intermediate neutral detents 144, 148 and 152 could be removed so that when shifting between first and fourth forward speeds, the operator would "feel" only the positions wherein a drive connection is actually established. The arcuate dimensions of teeth 64 may be varied to enlarge or decrease the size of spaces 70 into which projections 108 may be shifted. Moreover, the number of available gear ratios may be made more or less, and in some arrangements the number of grooves and shift keys required may be changed with corresponding changes in the change gears to receive the revised number of keys. For example, three axial grooves may be provided 120° apart for three shift keys and three teeth may be provided in gears 54 through 60 to define three arcuate key-receiving openings. Furthermore, the change gears and shifting arrangement could be provided on the counter shaft 34 rather than in the output shaft 36.

Referring now to FIGS. 1 and 3, four circular holes 163a, b, c and d are provided in plate 134 radially inwardly of detent seats 140, 144, 148 and 152 respectively. Operation of shift mechanism 118 to any neutral position wherein ball 156 engages one of seats 140, 144, 148 and 152 moves plate 134 such that the hole 163 radially inwardly of that one seat is directly below the actuator 164 of a neutral start safety switch 166 which is threaded into a hole 167 in cover 16. Actuator 164, in the form of a sphere, is retained within switch 166 for vertical movement and is spring biased downwardly to assume the position illustrated in FIG. 3 when hole 163a is aligned therewith (primary neutral position of transmission 10). With actuator 164 in this position, switch 166 forms a closed circuit between terminals 168 and 170 which is interlocked with the starting circuit to enable the engine which drives transmission 10 to be cranked. When shift mechanism 118 is operated from a neutral position to one of its gear-engaging positions (first, second, third, fourth or reverse), plate 134 forces actuator 164 upwardly out of the hole 163 with which it was engaged and maintains the actuator in retracted position in switch 166. When actuator 164 is so retracted, the circuit between terminals 168 and 170 opens to prevent the engine from being cranked. In the case of a riding lawnmover, garden tractor or the like, this safety feature prevents accidental lurching of the vehicle should it be attempted to start the engine with the transmission in other than the neutral position.

Moreover, should the engine stall when the transmission is in second, third or fourth gear, the provision of holes 163b, c and d permits the engine to be cranked when projections 108 are shifted to the immediately adjacent spaces 68 of one of the gears 54, 56 or 58. Thus, after such a stall, the likely angular misalignment of projections 108 with spaces 70 of the change gears lying between projections 108 and the space 68 of gear 60 which would prevent projections 108 from being conveniently shifted to the primary neutral position is inconsequential. It is to be noted that switch 166 is the only additional transmission part required to provide this feature. The spring biased actuator 164 and holes 163a, b, c and d also provide an additional detent arrangement for the neutral positions. Hence, it can be seen that detent seats 140, 144, 148 and 152 are optional whenever switch 166 is employed, and that various detent arrangements may provide either the same or different detent force for the neutral and gear-engaging positions.

Transmission 10 drives an output gear 172 on the left-hand external end of shaft 36. The load to be powered (such as the tractor axle) may be connected to gear 172 by a chain or other drive arrangement. It is also preferable to provide a clutch between the engine and input shaft 18 so that the engine may be disengaged when shifting gears. A circular rotor 174 is slidably keyed to the right-hand external end of shaft 36. If desired, a conventional disc brake assembly (not shown) may be attached to case 12 below shaft 36 so as to support a pair of brake pads on opposite sides of rotor 174. Such a disc brake usually has an actuator lever operated to cam the brake pads into gripping relation with rotor 174 to provide a braking torque on shaft 36, as is well understood in the art.

In the transmission thus described, change gears 54 through 60 are preferably constructed of a sintered metal comprising iron powder, which may have nickel content for improved impact strength. For example, one formulation which provides satisfactory results is as follows:

MATERIAL

NI — MN — MO Pre Alloy having the composition by weight of:
NI 0.45 percent
MO 0.60 percent
MN 0.35 percent
S 0.010 percent
P 0.010 percent
FE Balance
C 0.5/0.6 percent
Density 6.7 grams/c.c. (min.)
HEAT TREAT
Harden & Draw 400° – 600°F
To RC 32 – 40 Apparent Hardness Keys 104, 106 are preferably constructed from steel such as SAE 1117 steel and case hardened. Alternatively keys 104, 106 may be forged sintered metal. It has been observed that with this construction there is less chipping of teeth 64 than occurs when gears 54 through 60 are constructed from ordinary case hardened gear steel. Although the edges of teeth 64 and projections 108 are preferably beveled, beveling of teeth 64 may be unnecessary with the above-described preferred construction. Also, the four upright edges 186 of each projection 108 and the two outer upright edges 188 of each projection 114 are preferably beveled to reduce chipping when these edges 186, 188 contact the internal teeth of the change gears. Preferably, the corners are rounded to a radius of between 0.015 and 0.030 inch. It should be noted that the shaft keyways or grooves 92, 94 are entirely internal of the transmission enclosure and hence present no sealing problem between shaft 36 and the transmission housing when shaft 36 is journalled therein. In other words, portions 96 and 100 of shaft 36 are cylindrical and uninterrupted to fit closely within the associated bushings 38 so that grease cannot escape through the bushing. Moreover, because the moving parts, including the shift and safety switch actuating mechanisms, are all internal, they are protected from outside contamination. It can thus be seen that the invention provides a compact and low cost multispeed transmission which is of rugged construction. The transmission interior is preferably packed with lubricating grease after assembly so that minimum wear and long life of all moving parts are achieved.

FIG. 8 illustrates a modified transmission 10' embodying this invention which has five forward speeds and one reverse speed, and which is generally similar in construction and operation to transmission 10. Transmission 10' employs the same case 12 and cover 16 as transmission 10 and has a similar input shaft 18' (not shown) and countershaft 34' journalled therein. Five companion spur gears 200, 202, 204, 206 and 208 and a bevel gear 48' integral with spur gear 208 are splined in coaxial side by side relation on countershaft 34' for rotation therewith. Spur gears 200 through 208 correspond generally with spur gears 40 through 46 and bevel gear 48' with bevel gear 48 of transmission 10. Bevel gear 48' meshes with the bevel pinion gear 24 (not shown) fixed to input shaft 18' so that the input shaft rotates all six gears 200 through 208 and 48' in unison.

Companion gears 200 through 208 are in constant running mesh with five speed change spur gears 210, 212, 214, 216 and 218. Gears 210 through 218 are journalled in coaxial side by side relation for free rotation on a cylindrical portion 62' of output shaft 36'. Gears 210 through 218 are axially retained as a cluster or portion 62' by a shoulder 63' of output shaft 36' and a thrust race or washer 65. As shown in FIGS. 11 and 12, each change gear 210 through 218 has an axial bore 220 therethrough adapted to receive cylindrical portion 62' of shaft 36' for free rotation of the gear thereon, and a counterbore 222 in one face thereof in which a flat washer 224 is located either by mere seating in the counterbore so as to be readily removable, or being fixed in the counterbore as by brazing or sintering to the gear face. Each change gear has four symmetrically arranged arcuate slots or free spaces 228 in bore 220 which extend axially through the gear and terminate circumferentially at generally radially extending opposed end walls 230 and 232. Interposed between slots 228 are four integral teeth 64' which in assembly slidably bear at their peripheral face on output shaft 36'. Each free space or slot 228 has a generally arcuately extending step 234 therein and a shift key retaining slot 236 extending generally radially outwardly of step 234, the junction of step 234 with slot 236 being defined by an abutment wall 238 extending radially and axially of the gear. Washer 224 (FIG. 12) has a bore 239 with an inside diameter equal to that of bore 220 of the speed change gear and thus covers one axial end of each slot 228.

Figure 15:
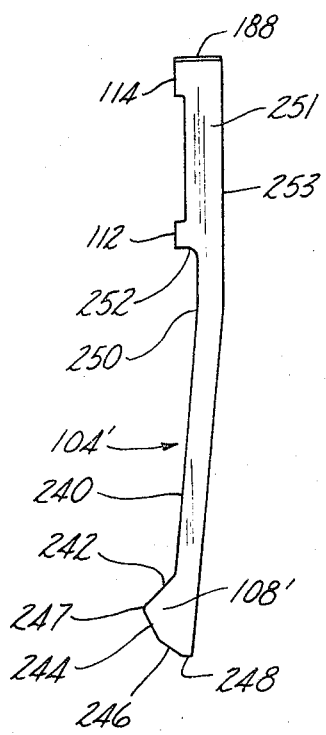
FIG. 15 is an enlarged side view of a shift key of the transmission of FIG. 8.

Gears 210 through 218 are selectively coupled for rotation with output shaft 36' by two identical shift keys 104' and 106' each of which has a cantilever spring arm 240 yieldably biasing generally radially outwardly of shaft 36', a projection or lug 108' located adjacent the free end of the key. Lugs 108' each have camming ramps which slidably engage with washers 224 in response to axial movement of the key lug through the change gears 210-218 to selectively and individually connect and disconnect these change gears with shaft 36'. Thus, as best seen in FIG. 15, each lug 108' has two ramps 242 and 244 inclined toward each other, extending generally radially outwardly and convergently terminating in an apex 247. Each lug 108' also has a ramp 246 having a steeper slope than ramp 244 and extending therefrom to a generally radially extending end face 248. Ramp 246 is located to facilitate rapid initial displacement of lugs 108' and prevent end face 248 from butting on the face of a washer 224.

Preferably, keys 104' and 106' are machined or die stamped from flat stock with the entire bottom edge or face of the key including the bottom edge of arm 240 lying in one plane. After machining or blanking of the key, its arm 240 is bent at 250 (FIG. 15) to incline the arm with respect to the shank 251 (FIG. 15) of key 104' so that it is inclined outwardly with respect to the axis of output shaft 36' when in assembled relation therewith with shank surfaces 253 seated flat on the bottom surface 92' or 94' of its associated groove. Preferably, bend 250 is axially spaced from projection or lug 112 approximately .250 inches. It has been found that if bend 250 is immediately adjacent projection 112, the key has a tendency to fracture in use, apparently due to localized high stresses produced by bending of the key aggravated by machining marks in the key from the machining of radius 252 adjacent projection 112.

Figure 14:
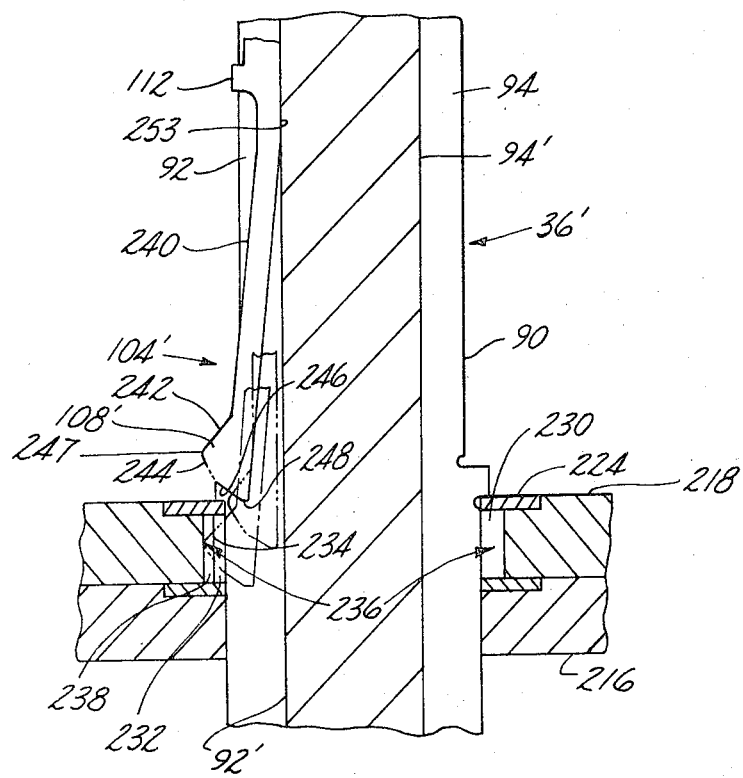
FIG. 14 is an enlarged fragmentary view of the output shaft of the transmission of FIG. 8 with one of the keys received in the shaft and two change gears received thereon.

Keys 104' and 106' are shifted axially back and forth in grooves 92 and 94 of shaft 36' by a shifter mechanism similar to previously described shifter mechanism 118. Thus, a sector plate 134' is fixed to shaft 120 which is connected to bifurcated shifter 122 operably coupled with collar 110. To correlate the rotary position of shaft 120 with the neutral and gear engaging positions of the shift keys, the outer generally arcuate edge 136' of sector plate 134' has a plurality of detent seats therein sequentially engageable with detent ball 156. Plate 134' has a reverse detent seat 138' but only one neutral detent seat 140'. Unlike plate 134, plate 134' has only one cylindrical hole 163a for actuating the neutral start safety switch 166, and it has five forward speed detent seats 254, 256, 258, 260 and 262 without any neutral detent seats therebetween. To facilitate the shifting of transmission 10' from one gear to another, detent seats 254 through 260 each have two inclined ramps 264 and 266 associated therewith, and detent seat 262 has an inclined ramp 264 associated therewith. Detent ball 156, due to the bias of its spring and the shape of the seats in plate 134' tends to be self-centering in the selected seats. The positions of shift keys 104' and 106' are correlated with the detent-retained positions of plate 134' so that when lugs 108' are received in slots 228 of each speed change gear 210 through 218, the lugs are centered so they do not bear on the adjacent washers 224 (as shown in phantom in FIG. 14). This yieldable retention of keys 104', 106' in centered position by detent ball 156 in the associated seat of plate 134' prevents a wearing away of the lugs or projections 108' which might otherwise occur if they were allowed to have a sliding frictional engagement with washer 224 of the adjacent speed change gear, which rotates relative to the shift key when transmission 10' is in use.

In use, transmission 10' is shifted from one gear to another by the rotation of control shaft 120 which shifts keys 104' and 106' axially in slots 92 and 94 respectively of shaft 36' while engaging and disengaging detent 156 with the various detent seats in plate 134'. When detent 156 is received in detent seat 140' of sector plate 134', transmission 10' is in neutral and shift keys 104' and 106' are in the position shown in FIG. 8. Rotation of shaft 120 clockwise (as viewed in FIG. 8) to engage detent 156 with reverse detent seat 138' moves shift keys 104' and 106' axially to the right (as viewed in FIG. 8) and engages key lug 114 with sprocket 78, thereby coupling sprocket 78 with output shaft 36' to effect reverse drive of the output shaft 36'.

Rotation of shaft 120 counterclockwise from reverse or neutral position so that detent 156 engages in detent seat 254 moves shift keys 104' and 106' axially to the left to couple speed change gear 218 with output shaft 36' to effect forward drive of the output shaft in first gear. During this axial movement of keys 104' and 106' to the left, ramps 246 and 244 of each lug 108' will sequentially engage the washer 224 associated with gear 218 and thereby cam the lugs 108' radially inwardly, the resilient spring arms 240 of the associated keys deflecting as they yieldably resist such camming action. After apex 247 has cleared washer 224, arms 240 force lugs 108' radially outwardly into slots 228 thereof if or when the lugs register therewith (as shown in broken line in FIG. 14). In some instances, when lugs 108' are shifted axially into registry with the bore of a gear they will first bear on the peripheral face of teeth portions 64' between slots 228 of the gear and then will spring radially outwardly when the closest slot 228 is brought into angular registry with the lug as the gear rotates clockwise (as viewed in FIG. 10) with respect to shaft 36'. Thus, each lug 108' will be sprung by its associated arm 240 into a slot 228 adjacent end wall 232, strike against and momentarily slidably bear on step 234, and then be sprung further radially outwardly into the associated retaining slot 236 where the lugs are snugly received between generally opposed radial walls 230 and 238 to thereby couple the gear with the output shaft. However, in the event that lugs 108' of the keys are axially shifted into registry with gear 218 precisely when one of its slots 228 is aligned with the keys, they will spring directly into the slots without first bearing on teeth portions 64'. When this occurs, the rate of radially outward movement of lugs 108' into slots 228 is controlled by the engagement of ramps 242 of the lugs with the inner edge of a washer 224 alone or in cooperation with step 234 of the slot.

In a similar manner, rotation of shaft 120 so that detent 256 sequentially engages with detent seats 254 through 264 in sector plate 134' moves keys 104' and 106' axially to the left (FIG. 8) to sequentially engage lugs 108' of the keys in an opposed pair of slots 228 of speed change gears 216 through 210 to sequentially couple each of these gears with output shaft 36', thereby providing the second through fifth forward speeds of transmission 10'.

Whenever transmission 10' is shifted from one forward gear to another, complete disengagement of the lugs 108' of the shift keys from one speed change gear before reengagement of the lugs with another speed change gear is assured by the cooperation of ramps 242, 244 and 246 of the lugs with washers 224 of the speed change gears. For example, when transmission 10' is shifted from the first forward speed change gear 218 to the second forward speed change gear 216, ramps 246 and 244 sequentially bear on and slide under washer 224 of gear 216, thus camming lugs 108' of the shift keys radially inwardly to completely disengage them from slots 228 of gear 218 before the lugs can begin to move radially outwardly to engage in the slots of gear 216. Likewise, when transmission 10' is shifted back in the other direction from second gear to first gear, ramps 242 bear on washer 224 of gear 216 to cam lugs 108' of the shift keys radially inward to completely disengage the lugs from slots 228 of gear 216 before the lugs can begin to move radially outward to engage in the slots 228 of gear 218.

It is also to be noted that transmission 10', unlike transmission 10, can always be readily shifted from neutral into any forward gear or from any forward gear to another forward gear regardless of the angular relationship of speed change gears 210 through 218 to each other. This is due to the provision of yieldable spring arms 240 on keys 104' and 106' which permit lugs 108' during shifting of the keys to move radially inwardly to retract and disengage from slots 228, rather than, as in transmission 10, sliding through the slots in the gears which in many instances are not axially aligned with each other and thus block passage of the keys axially through the gears. Thus, transmission 10' can be readily shifted through the forward gears without having to jog or slightly rotate the output shaft of the transmission to align the shift keys with the slots in the gears.

To provide adequate time for lugs 108' of shift keys 104' and 106' to move radially outward and become fully seated or bottomed in retaining slots 236 of the speed change gears, the arcuate length of slots 228 is greater than the transverse width or thickness of lugs 108'. Preferably, the arcuate length of slots 228 is in the range of 1 ¼ to 2 times and preferably substantially 1 ½ times the thickness (the vertical dimension of lug 108' as seen in FIG. 13) of the portion of lugs 108' received in the slots. However, so increasing the arcuate length of the slots would introduce excessive backlash between output shaft 36' and the speed change gear driving the output shaft were it not for the provision of step 234 in each slot. Wall 230 and the riser wall 238 of step 234 thus form a shorter retaining slot 236 and provide more closely spaced opposed abutments for receiving lugs 108' therebetween. Preferably, the distance between walls 230 and 238 is just sufficiently greater than the thickness of lugs 108' to provide sufficient clearance for the lugs to slide into retaining slots 236. Hence, any backlash due to relative angular movement between output shaft 36' and the speed change gear is reduced to an imperceptible amount once lugs 108' of the shift keys are received in retaining slots 236. Accordingly, it will now be appreciated that stepped slots 228 provide both adequate time for the lugs to become fully engaged in slots 236 while simultaneously eliminating backlash in transmission 10'. Moreover, steps 234 in slots 228 ease the entry of lugs 108' into retainer slots 236, thereby minimizing the impact and resulting shock with which the lugs bottom in slot 236, which in turn is believed to minimize wear and tear on the lugs of shift keys 104' and 106' and thereby substantially increase their useful life.

Another advantage of transmission 10' is the very positive "feel" afforded the operator when manually shifting through the forward drive shift points of transmission 10'. This yieldable resistance to shifting is provided either entirely by the action of spring keys 104', 106' or in conjunction with the ramps 264 and 266 of sector plate 134' which one associated with the speed change gears 210 through 218. These ramps function during shifting as over-center cams tending to initially retard and then subsequently urge shifting mechanism 118' of transmission 10' from one gear to an immediately adjacent gear. This positive feel is provided even in the absence of the detent seats by the camming of projections or lugs 108' of shift keys 104', 106' over a washer 224 every time transmission 10' is shifted from one forward gear into another, neutral into a forward gear, or a forward gear into neutral. However, if the detent seats are eliminated from plate 134', it is preferable to modify edge 136' thereof so as to be a smooth segment of a spiral to yieldably bias shift keys 104', 106' generally axially to the right (as viewed in FIG. 8) so the projections 108' thereof bear against the washer 224 of the engaged gear and, hence, will not bear on the washer 224 of the speed change gear immediately to the left which will be rotating relative to the engaged gear. This modification will thus prevent a wearing away of lugs 108' and/or washers 224 by sliding frictional engagement therebetween. The biasing force thus developed on shift keys 104' and 106' must not, however, produce sufficient force to cam lugs 108' radially inwardly and thereby unintentionally decouple the output shaft 36' from the driving gear.

In the transmissions thus described, speed change gears 54 through 60 and 210 through 218 are preferably constructed of a sintered metal comprising iron powder, which may have nickel content for improved impact strength. One exemplary formulation which provides satisfactory results has been set forth previously herein.

In accordance with another feature of transmission 10', speed change gears 210 through 218 are preferably made by powdered metallurgy techniques and counterbore 222 is formed during compacting of the powdered metal compacts from which the sintered metal gears are made. It has been found that, in addition to eliminating subsequent machining, configurating the compacting dies to produce the counterbore in the green compact produces a higher density of the powdered metal in the area of teeth 64' and slots 228 which in turn increases the strength and impact resistance in this area of the sintered metal gear.

In addition, when speed change gears 210 through 218 are made by powdered metallurgy techniques, washers 224 can be pre-coated with brazing material and placed as loose inserts directly into the cavity of the gear compacting mold. When the compacts are subsequently sintered, washers 224 will securely adhere to the sintered metal gear. Preferably, the washers 224 received in counterbore 222 of gears 210 through 218 are made of a high carbon steel such as SAE 1075 steel and case hardened. It also has been observed that there is less chipping of teeth 64 of gears 54 through 60 when constructed of sintered metal rather than ordinary case hardened gear steel. Although the edges of teeth 64 and lugs 108 are preferably beveled, beveling of teeth 64 may be unnecessary with the above-described preferred construction.

Shift keys 104, 106 and 104' and 106' are preferably constructed from steel such as SAE 1117 steel and case hardened. Alternatively, the shift keys may be forged sintered metal. Also, the two outer upright edges 188 of each projection or lug 114 of shift keys 104' and 106', like keys 104 and 106, are preferably beveled to reduce chipping when edges 188 engage the speed change gears. Preferably, the corners are beveled by being rounded to a radius of between 0.015 and 0.030 inch.

It should be noted that the keyways or grooves 92, 94 in output shaft 36' of transmission 10' are entirely internal of the transmission enclosure and, hence, present no sealing problem between the output shaft and its associated transmission housings when the shaft is journalled therein. Transmission 10' also retains the other advantages of transmission 10, such as protection of the moving parts, including the shift and safety switch actuating mechanisms, from outside contamination, a compact low-cost rugged construction, minimum wear and long life of all moving parts.

We claim:

1. In a transmission, the combination comprising a housing, a shaft journaled in said housing, said shaft having first and second portions extending axially of said shaft, said first portion being cylindrical and diametrically enlarged transversely of the axis of said shaft relative to said second portion, said shaft having a groove in the outer surface thereof extending axially in said diametrically enlarged first portion and terminating interiorly of said housing, a plurality of change gears freely journaled on said first portion of said shaft within said housing and having key-receiving means, a key within said groove axially slidable between successive gear-engaging positions and having successive interengagements with said key-receiving means of successive gears when axially shifted to successive gear-engaging positions whereby the selected gear with which said key is interengaged is drivingly coupled via said key to said shaft, at least one end of said groove terminating in an axially open end adjacent said second portion to permit said key to be inserted lengthwise into said groove through said axially open end thereof, and shift means for axially shifting said key between said gear-engaging positions.

2. The combination of claim 1 wherein each gear comprises means forming an arcuate recess in the bore thereof defining said key-receiving means thereof and wherein said key comprises a lug normally projecting radially outwardly of said groove beyond the surface of said diametrically enlarged portion for successive interengagement with said arcuate recesses of successive gears when said key is axially shifted to successive gear-engaging positions.

3. The combination of claim 2 wherein said arcuate recesses of said gears are axially separated to define free spaces between adjacent recesses and wherein the axial dimension of said lug is less than the axial dimension of said free spaces to thereby define a neutral position of said key between adjacent gear-engaging positions thereof whereby when said key is shifted to a neutral position, said shaft is drivingly disconnected from said gears.

4. The combination of claim 1 wherein said shift means comprises a collar journaled on said grooved shaft within said housing and axially slidable thereon, said collar embracing a portion of said key, said key and said collar having means operatively connecting said collar with said key to render said key axially slidable in unison with said collar, and actuating means operatively connected to said collar for axially shifting said collar on said grooved portion.

5. The combination of claim 4 wherein said means operatively connecting said key with said collar comprises a pair of axially spaced-apart annular surfaces on said collar and complementary projection means on said key projecting radially outwardly of said groove beyond the outer surface of said grooved shaft, said collar surfaces and said projection means being radially overlapped to restrain relative axial movement between said key and collar.

6. The combination of claim 5 wherein said means operatively connecting said actuating means with said collar comprises means forming a central circular groove in the outer surface of said collar and a rotary shift arm engaging said groove of said collar such that rotation of said shift arm by said actuating means shifts said collar axially on said grooved shaft.

7. The combination of claim 1 further including detent means operable with said shift means for correlating positions of said shift means to said gear-engaging positions of said key.

8. The combination of claim 7 wherein said shift means comprises a rotary shift shaft journaled in said housing and said detent means comprises a rotary member on said shift shaft having a portion radially spaced from said shift shaft for movement opposite a portion of said housing, a detent-seat-engaging member between said two portions biased radially of said shift shaft and a plurality of angularly spaced-apart first detent seats in one of said portions, said detent-seat-engaging member having selective engagements with said first detent seats in accordance with the rotary position of said shift shaft to thereby correlate the rotary positions of said shift shaft with the gear-engaging positions of said key.

9. The combination of claim 8 wherein said detent means is within said housing.

10. The combination of claim 8 wherein said rotary member comprises a plate having a generally arcuate edge portion radially spaced from said shift shaft, said plurality of first seats being formed in said edge of said plate, said detent-seat-engaging member comprising a ball biased inwardly toward said shift shaft for engagement one at a time with said first seats.

11. The combination of claim 10 wherein said detent means further comprises means forming a plurality of second detent seats in said plate each having a radial alignment with said shift shaft and those of said first detent seats correlated to neutral positions of said key, said second seats being arcuately arranged at a selected radial distance from said shift shaft, and a switch on said housing having a switch actuator biased toward said plate for selective engagement with said second seats in accordance with the angular position of said shift shaft, said switch being operable in response to engagement of said switch actuator with said second seats to thereby correlate switch operation to the neutral positions of said key.

12. The combination of claim 7 wherein said detent means comprises a plate, means for supporting said plate on said housing for rotary movement about a fixed axis, said plate having switch actuator displacement means movable therewith and disposed at a selected radial distance from said axis, and a switch on said housing having a switch actuator biased toward said plate for selective engagement with said displacement means in accordance with the angular position of said plate, said switch being operable in response to engagement of said switch actuator with said displacement means to thereby correlate switch operation to a neutral position of said key.

13. The combination of claim 12 wherein said detent means is within said housing.

14. The combination of claim 1 wherein said shift means comprises a collar journaled on said diametrically enlarged portion of said shaft and axially slidable thereon, means operatively connecting said collar with said key to render said key axially slidable in unison with said collar and means for axially shifting said collar on said shaft.

15. The combination of claim 14 wherein said means operatively connecting said collar with said key comprises a pair of axially spaced projections on said key projecting radially outwardly of said groove and extending beyond the outer surface of said diametrically enlarged portion of said shaft, said collar being axially trapped between said two projections.

16. The combination of claim 15 wherein said means for shifting said collar comprises a rotary member journaled in said housing, means forming a central circular groove in the outer surface of said collar and means on said member engaging said groove such that rotary movement of said member shifts said collar axially on said shaft.

17. The combination of claim 15 wherein said key further comprises a third projection normally projecting radially outwardly of said groove beyond the outer surface of said shaft and axially spaced from said pair of projections, said third projection having successive interengagements with said key-receiving means of successive gears when said key is axially shifted to successive gear-engaging positions by axially shifting said collar on said shaft.

18. The combination of claim 17 wherein said shift means comprises a collar journaled on said shaft and axially slidable thereon, said collar encircling said key and being spaced axially between said two projections, means operatively connecting said collar with said key to render said key axially slidable in unison with said collar and means for axially sliding said collar on said shaft.

19. The combination of claim 18 wherein said means operatively connecting said collar with said key comprises a third projection on said key projecting radially outwardly of said groove beyond the outer surface of said shaft, said collar being axially trapped between said third projection and one of said first-two-mentioned projections.

20. The combination of claim 19 wherein said means for axially shifting said collar comprises means forming a central circular groove in the outer surface of said collar and a rotary member journaled on said housing and engaging said groove such that when said member rotates, said collar slides on said shaft.

21. In a transmission, the combination comprising a housing, a shaft journaled in said housing and having a groove in the outer surface thereof extending axially thereof, said groove terminating within said housing, key means within said groove and axially slidable therein, a plurality of change gears journaled on said shaft within said housing at least one of which is adjacent one end of said key means, said change gears having key-receiving means therein associated with said groove of said shaft, said key means having a pair of axially spaced-apart lug means normally projecting outwardly of said groove beyond an outer surface of said shaft when engaged with key-receiving means of said gears, said lug means being spaced axially apart such that said lug means are disengaged from all of said key-receiving means of said change gears and said additional gear when said key means is in a neutral position wherein all of said gears are drivingly disconnected from said shaft, said lug means adjacent said change gears having successive interengagements with said key-receiving means of successive change gears as said key means is axially shifted from said neutral position toward said change gears, said lug means adjacent said additional gear having an interengagement with said key-receiving means of said additional gear when said key means is axially shifted from said neutral position toward said additional gear, and shift means for axially shifting said key means into said neutral and gear-engaging positions, whereby the selected gear with which said key means is interengaged is drivingly coupled via said key means to said shaft.

22. In a transmission, the combination comprising a shaft, a plurality of gears, means for driving said gears, shift means including a shift member movable between successive gear-engaging positions for operatively connecting said gears one at a time to said shaft, said shift member having neutral positions separating adjacent gear-engaging positions wherein said gears are drivingly disconnected from said shaft and detent means for correlating the neutral positions of said shift member to certain positions of said shift means comprising a plate, means forming a plurality of seats in said plate, a switch having a switch actuator biased toward said plate and movable between an actuated position and a nonactuated position and means movable with said shift member for moving said switch actuator relative to said plate such that said actuator successively engages said seats, said actuator being operated to one of its positions when engaged with said seats and operated to its other position when disengaged from said seats, the arrangement of said seats of said plate being such that said actuator is operated to one of its positions by said plate when said shift member is in said neutral positions whereby switch operation is correlated to said neutral positions.

23. The combination of claim 22 wherein said plate is movable with said shift member.

24. The combination of claim 23 wherein said shift member is journaled for rotation about a fixed axis and wherein the plane of said plate is perpendicular to said shift member, said seats being angularly spaced apart in said plate at a selected radial distance from said axis.

25. The combination of claim 24 further including additional detent means for correlating additional positions of said shift means to the gear-engaging positions of said shift member.

26. The combination of claim 1 wherein the material of said gears comprises a sintered powdered metal consisting of iron pre alloy having substantially the following percentage composition by weight: Nickel (0.45 percent); Molybdenum (0.60 percent); Manganese (0.35 percent); Sulfur (0.010 percent); Phosphorus (0.010 percent); Iron (Balance); Carbon (0.5/0.6 percent) and having a minimum density of 6.7 grams/c.c.

27. The combination of claim 1 wherein said gears comprise a sintered ferrous powdered metal material.

28. In a transmission, the combination comprising a shift, journal means for supporting said shaft for rotation about its axis, a collar slidably received on a first portion of said shaft, said shaft having a groove in the outer surface thereof extending axially of said shaft, a plurality of change gears journaled on said shaft and having key-receiving means, a key within said groove axially slidable between successive gear-engaging positions and having means thereon operable to successively interengage said key-receiving means of said gears when said key is axially shifted to successive gear-engaging positions whereby the selected gear with which said key is interengaged is drivingly coupled via said key to said shaft, a pair of axially spaced-apart retainer lugs on said key projecting outwardly of said groove beyond an outer surface of said shaft, said collar encircling said key and being axially trapped between said pair of retainer lugs to render said key axially slidable in unison with said collar, said shaft having a circumferentially extending face extending inwardly radially of said shaft from said outer surface thereof and terminating in an axially open end at said face to thereby permit slip-on assembly of said key and said collar to said shaft by endwise insertion of the subassembly of said key in said collar with said collar trapped between said pair of retainer lugs when said collar is concentrically aligned with said shaft and said key is angularly aligned with said open end of said groove to permit said subassembly to be moved generally axially onto said shaft such that said collar in assembly is received on said first portion of said shaft, and shift means for axially shifting said collar on said shaft to thereby shift said key to said gear-engaging positions.

29. The combination of claim 28 wherein said shaft has second and third portions having uninterrupted cylindrical surfaces, and said journal means likewise has uninterrupted first and second cylindrical bores respectively receiving said second and third portions with a close running fit, said transmission being enclosed in a closed housing with said journal means being mounted with a seal fit in outer walls of said housing and said shaft protruding from said housing via at least one of said journal means.

30. The combination of claim 29 wherein said means on said key operable to successively engage said key-receiving means of said gears comprises a third lug having successive interengagements with said key-receiving means of said gears when said key is axially shifted to successive gear-engaging positions.

31. The combination of claim 30 wherein said third lug comprises axially spaced-apart end surfaces and side surfaces extending axially between said end surfaces, said side surfaces being connected in part to said end surfaces by outwardly-extending beveled edges.

32. The combination of claim 29 wherein said face is defined by a shoulder at a junction of said first portion with one of said second and third portions, said cylindrical surface of said one portion having a radius equal to or less than the radial distance between the axis of said shaft and a bottom surface of said groove.

33. In a transmission, the combination comprising a housing defining a completely enclosed gear chamber within said housing and having first and second spaced walls defining opposite sides of said housing, a shaft having axially spaced journal portions having uninterrupted cylindrical surfaces, first and second sealing means in said first and second side walls respectively having uninterrupted cylindrical bores respectively receiving said first and second journal portions with a close running fit for journaling said shaft in said housing side walls, said shaft having a groove in the outer surface thereof extending axially thereof and terminating interiorly of said housing between said journal portions, a plurality of change gears journaled on said shaft within said housing chamber and having key-receiving means, a key within said groove axially slidable between successive gear-engaging positions and having successive interengagements with said key-receiving means of successive gears when axially shifted to successive gear-engaging positions whereby the selected gear with which said key is interengaged is drivingly coupled via said key to said shaft, and shift means within said chamber for axially shifting said key between said gear-engaging positions.

34. The combination of claim 33 wherein said shaft has a key-receiving portion within said housing having a diameter larger than at least one of said journal portions, said groove extending axially in said key-receiving portion and said shaft having a root surface defining the base of said groove spaced radially outwardly from the axis of said shaft at least flush with the cylindrical surface of at least one of said journal portions.

35. The combination of claim 34 wherein said housing comprises a case and a cover separable from one another and having mutually mating surfaces defining edges of said side walls abutted in the closed condition of said housing, said sealing means being disposed in said edges such that the axis of said shaft is substantially coincident with said surfaces.

36. The combination of claim 1 wherein each of said change gears has an axial bore therethrough by which it is journaled on said shaft, said key-receiving means of at least one of said change gears comprises at least one recess therein extending radially outward of said bore and opening into said bore, said recess having a pair of generally axially extending abutments therein in generally opposed arcuately spaced relation to each other with one of said abutments terminating in said recess radially outward of said bore, said key comprises a lug movable both axially of said shaft to successive gear-engaging positions to underlie each of said gears having said recess therein and generally radially outward of the portion of said shaft on which said change gears are journaled into a recess between the abutments of an associated change gear overlying said lug to drivingly couple via said key said change gears one at a time with said shaft for rotation therewith, the transverse width of the portion of said lug receivable between said abutments being dimensioned in relation to the generally arcuate spacing between said abutments such that when said lug is received between the abutments of a recess of an associated change gear there can be substantially no relative rotation between an associated change gear and said shaft, and at least one of said recesses at its associated bore having a generally arcuate length encompassing said abutments and extending beyond said one abutment by a distance at least substantially one quarter of the transverse width of the portion of said lug, whereby both backlash between the change gear coupled with said shaft for rotation therewith and said shaft is eliminated and said lug can be readily fully received between the abutments of a change gear when coupling a rotating change gear with said shaft for rotation therewith.

37. The combination of claim 1 wherein said key comprises a lug which when received in said groove continuously projects radially outwardly of said groove beyond the outer surface of the portion of the shaft on which said change gears are journaled, said key-receiving means of said gears comprising passages extending axially through said change gears open at the axially opposite ends thereof to receive said lug so that said lug is shiftable axially in said passages when said key is axially shifted to successive gear-engaging positions.

38. The combination of claim 1 wherein said key comprises a resilient metallic arm with a lug adjacent one end thereof, said key being slidably received in said groove for generally axial movement therein with said arm yieldably urging said lug radially outwardly of the portion of said shaft on which said change gears are journaled.

39. The combination of claim 21 wherein said key means also comprises a resilient metallic arm integral with and interposed between said axially spaced apart lug means with said lug means adjacent said change gears being carried by said inherently resilient arm adjacent the free end thereof and being yieldably urged by said arm radially outwardly of the portion of said shaft on which said change gears are journaled.

40. The combination of claim 28 wherein said key also comprises a resilient metallic arm integrally connected with said pair of axially spaced apart lugs adjacent one end of said arm and said means operable to successively interengage said key-receiving means comprises a third lug carried by said arm adjacent the other end thereof and integral therewith, said arm yieldably urging said third lug radially outwardly of the portion of said shaft on which said change gears are journaled.

41. The combination of claim 36 wherein said key also comprises a resilient metallic arm, said lug being integral with said arm and adjacent one end thereof, said key being slidably received in said grooves for generally axial movement therein with said arm yieldably urging said lug radially outwardly of the portion of said shaft on which said change gears are journaled.

42. The combination of claim 36 wherein each of said change gears comprises sintered powdered iron having a minimum density of 6.7 grams per cubic centimeter.

43. The combination of claim 36 wherein each said recess in each of said change gears extends generally axially throughout each of said gears and which also comprises a washer carried by each of said change gears adjacent one face thereof and having an inner peripheral portion forming an end wall in each of said recesses to thereby close each said recess at the end thereof adjacent said one face.

44. The combination of claim 43 wherein each of said change gears comprises sintered powdered iron having a minimum density of 6.7 grams per cubic centimeter and has a counterbore therein opening into one face thereof with said counterbore being formed therein prior to sintering of the powdered iron thereof, and said washer of each of said change gears is fixedly received in said counterbore thereof.

45. In a transmission, the combination comprising a housing, a shaft journaled in said housing, a plurality of separate change gears each having an axial bore therethrough journaled on a portion of said shaft for free rotation relative thereto, at least one of said gears having a recess therein extending radially outward of said bore and opening into said bore and a pair of generally axially extending abutments in at least one of said recesses in generally opposed arcuately spaced relation to each other with one of said abutments terminating in said recess radially outward of said bore, and key means having a lug carried by said shaft for rotation therewith, said lug being movable both generally axially of said shaft to selectively underlie each of the gears having an associated pair of abutments and generally radially outwardly of said shaft portion into a registered recess between said abutments thereof to couple said change gears having an associated pair of abutments one at a time with said shaft for rotation therewith, said lug having a transverse width slightly less than the spacing between said abutments of each recess to thereby minimize relative rotation between said shaft and the selected change gear when said lug is received between said abutments thereof, and each of said recesses with an associated pair of abutments having at its associated bore a generally arcuate length encompassing said abutments and extending beyond said one abutment by a distance at least substantially one quarter of the transverse width of said lug, whereby both back-lash between said shaft and the change gear coupled with said shaft for rotation therewith is eliminated and said lug can be readily fully received between the abutments of a change gear when coupling a rotating change gear with the shaft for rotation therewith.

46. The combination of claim 45 wherein each of said recesses has a step therein adjacent said one abutment, said step having a surface disposed radially outwardly of said bore extending generally arcuately from said one abutment to the circumferential end of said recess remote from the other of said abutments.

47. The combination of claim 45 wherein circumferential length of each recess at its associated bore is at least one and one half times the circumferential spacing between said abutments.

48. The combination of claim 45 wherein the circumferential length of each recess at its associated bore is in the range of one and one quarter to twice the circumferential spacing between said abutments.

49. The combination of claim 45 including means forming a groove in the outer surface of said shaft extending axially thereof and wherein said key means comprises a key having a resilient arm with said lug being integral with said arm adjacent a free end thereof, said key being slidably received in said groove for generally axial movement therein with said arm yieldably urging said lug to a position wherein said lug protrudes radially outwardly of said shaft portion and said lug is spaced from the bottom of said groove.

50. The combination of claim 49 wherein each of said recesses extends generally axially throughout its associated change gear and which also comprises a washer carried by each of said change gears adjacent one face thereof and having an inner peripheral portion closing the end of said recess adjacent said one face, whereby said washers cooperate with said lug to shift said lug generally radially inwardly against the bias of said resilient arm to disengage said lug from a recess of a change gear when said lug is moved axially past said washer whereby the change gear is decoupled from said shaft.

51. The combination of claim 50 wherein each of said lug has two generally opposed ramps on edge faces of said lug with said ramps being inclined with respect to each other and converging radially outwardly of said lug, said ramps being adapted to bear on said washers to disengage said lug from said recess in said change gears when said lug is moved axially past said washers.

52. The combination of claim 51 wherein said key comprises a shank connected to the end of said arm remote from its free end, said shank having a flat bottom surface lying flat on the bottom surface of said groove, said arm extending at a gradual angle from shank away from the bottom surface of said groove so as to function as a cantilever spring arm.

53. The combination of claim 52 wherein said change gears comprise sintered powdered iron and said washers comprise sheet metal stampings.

54. The combination of claim 53 wherein each of said change gears has a counterbore therein opening into one face thereof with said counterbore being formed therein when compacting the powdered iron thereof, and the associated washer is located in said counterbore.

55. The combination of claim 54 wherein each of said washers is made of case hardened high carbon steel.

56. The combination of claim 55 wherein said washers are fixed to said change gears by the sintering of the powdered iron thereof.

57. The combination of claim 51 wherein said key comprises a one-piece member with said lug and said arm being homogeneously integral, said arm being a continuation of said shank and being bent with permanent deformation to incline said arm to slope generally radially outwardly as it extends from said shank to said free end of said arm.

58. The combination of claim 57 wherein the bend in said arm is axially spaced from said shank to thereby increase the fatigue resistance of said one-piece key.

59. The combination of claim 58 wherein said bend is spaced from said shank at least substantially one-fourth of an inch.

60. The combination of claim 58 wherein said shank has second and third spaced lugs protruding therefrom beyond the outer surface of said shaft, and wherein a collar encircles said shaft and is trapped between said second and third lugs to provide means for shifting said key axially of said shaft.

61. The combination of claim 21 wherein said shaft has first and second portions extending axially of said shaft, said first portion being cylindrical and diametrically enlarged transversely of the axis of said shaft relative to said second portion, and said groove extends axially in said diametrically enlarged first portion with at least one end of said groove terminating in an axially open end adjacent said second portion to permit said key means to be inserted lengthwise into said groove through said axially open end thereof.

62. The combination of claim 33 wherein said shaft has first and second portions extending axially of said shaft, said first portion being cylindrical and diametrically enlarged transversely of the axis of said shaft relative to said second portion, and said groove extends axially in said diametrically enlarged first portion with at least one end of said groove terminating in an axially open end adjacent said second portion to permit said key to be inserted lengthwise into said groove through said axially open end thereof.

63. The combination of claim 1 wherein said housing defines a completely enclosed gear chamber within said housing and has first and second spaced walls defining opposite sides of said housing and said shaft has axially spaced journal portions having uninterrupted cylindrical surfaces, and the combination further comprises first and second sealing means in said first and second side walls respectively having uninterrupted cylindrical bores respectively receiving said first and second journal portions with a close running fit for journaling said shaft in said housing side walls, said groove extending axially of said shaft terminates interiorly of said housing between said journal portions.

64. The combination of claim 21 wherein said housing defines a completely enclosed gear chamber within said housing and has first and second spaced walls defining opposite sides of said housing, and said shaft has axially spaced journal portions having uninterrupted cylindrical surfaces, and the combination further comprises first and second sealing means in said first and second side walls respectively having uninterrupted cylindrical bores respectively receiving said first and second journal portions with a close running fit for journaling said shaft in said housing side walls, said groove extending axially of said shaft terminates interiorly of said housing between said journal portions.

65. The combination of claim 61 wherein said housing defines a completely enclosed gear chamber within said housing and has first and second spaced walls defining opposite sides of said housing and said shaft has axially spaced journal portions having uninterrupted cylindrical surfaces, and the combination further comprises first and second sealing means in said first and second side walls respectively having uninterrupted cylindrical bores respectively receiving said first and second journal portions with a close running fit for journaling said shaft in said housing side walls, said groove extending axially of said shaft terminates interiorly of said housing between said journal portions.

* * * * *